United States Patent
Yang

(10) Patent No.: US 10,797,985 B2
(45) Date of Patent: *Oct. 6, 2020

(54) SYSTEMS AND METHODS FOR SELECTION BETWEEN MULTIPLE REDUNDANT DATA STREAMS

(71) Applicant: Schweitzer Engineering Laboratories, Inc., Pullman, WA (US)

(72) Inventor: Qiaoyin Yang, Bothell, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,468

(22) Filed: Dec. 18, 2018

(65) Prior Publication Data
US 2019/0149446 A1    May 16, 2019

Related U.S. Application Data

(63) Continuation of application No. 15/417,059, filed on Jan. 26, 2017, now Pat. No. 10,205,647.

(51) Int. Cl.
| | |
|---|---|
| *H04L 12/26* | (2006.01) |
| *H04B 1/74* | (2006.01) |
| *G06F 11/20* | (2006.01) |
| *H04L 29/12* | (2006.01) |

(52) U.S. Cl.
CPC .......... *H04L 43/16* (2013.01); *G06F 11/2007* (2013.01); *H04B 1/74* (2013.01); *H04L 43/0829* (2013.01); *H04L 43/0847* (2013.01); *H04L 43/0852* (2013.01); *H04L 61/6022* (2013.01)

(58) Field of Classification Search
CPC . H04L 43/16; H04L 43/0829; H04L 43/0852; H04L 43/0847; H04B 1/74; G06F 11/2007

See application file for complete search history.

(56) References Cited

U.S. PATENT DOCUMENTS

| | | | | |
|---|---|---|---|---|
| 2010/0020724 A1* | 1/2010 | Wimmer | ............... | H02H 1/0061 370/254 |
| 2010/0165849 A1* | 7/2010 | Eisenberg | ........... | H04L 43/0811 370/242 |
| 2011/0003570 A1* | 1/2011 | Yu | ........................ | H04H 60/41 455/226.1 |
| 2011/0112699 A1* | 5/2011 | Tournier | ................ | H02H 7/261 700/292 |
| 2011/0196627 A1* | 8/2011 | Steinhauser | ............ | H04L 43/08 702/58 |
| 2012/0233296 A1* | 9/2012 | Wimmer | ............. | H02J 13/0086 709/220 |
| 2012/0294177 A1* | 11/2012 | Yan | ........................ | H04L 45/02 370/252 |

(Continued)

*Primary Examiner* — Gary Mui
(74) *Attorney, Agent, or Firm* — Justin K. Flanagan; Richard M. Edge

(57) ABSTRACT

The disclosure includes systems and methods for the analysis, comparison, and selection between multiple redundant data streams. The data streams may be analyzed, compared, and/or selected based on the individual number of consecutive data frame losses in a data stream, the number of channel noise errors over a time period in a data stream, the clock synchronization values associated with a data stream, the traversal time of a data stream, and/or a MAC address associated with a data stream.

11 Claims, 9 Drawing Sheets

(56) References Cited

U.S. PATENT DOCUMENTS

| | | | |
|---|---|---|---|
| 2013/0031164 A1* | 1/2013 | Sundaram | H02H 7/261 |
| | | | 709/203 |
| 2013/0215771 A1* | 8/2013 | Obrist | H04L 41/0213 |
| | | | 370/252 |
| 2013/0235747 A1* | 9/2013 | Le | H04W 24/08 |
| | | | 370/252 |
| 2016/0197800 A1* | 7/2016 | Hui | H04L 43/062 |
| | | | 370/252 |
| 2018/0034689 A1* | 2/2018 | Kanabar | H02J 13/0062 |

\* cited by examiner

SYSTEMS AND METHODS FOR SELECTION BETWEEN MULTIPLE REDUNDANT DATA STREAMS

RELATED APPLICATIONS

This application is a continuation of U.S. patent application Ser. No. 15/417,059 filed on 26 Jan. 2017, titled "Systems and Methods for Selection Between Multiple Redundant Data Streams" and naming Qiaoyin Yang as inventor, which is hereby incorporated by reference in its entirety.

TECHNICAL FIELD

This disclosure relates to data stream selection systems and methods. More particularly, this disclosure relates to systems and methods for selection and use of one or more of a plurality of data streams associated with a measurement or monitoring value.

BRIEF DESCRIPTION OF THE DRAWINGS

Non-limiting and non-exhaustive embodiments of the disclosure are described herein, including various embodiments of the disclosure with reference to the figures listed below.

Figure 1A:
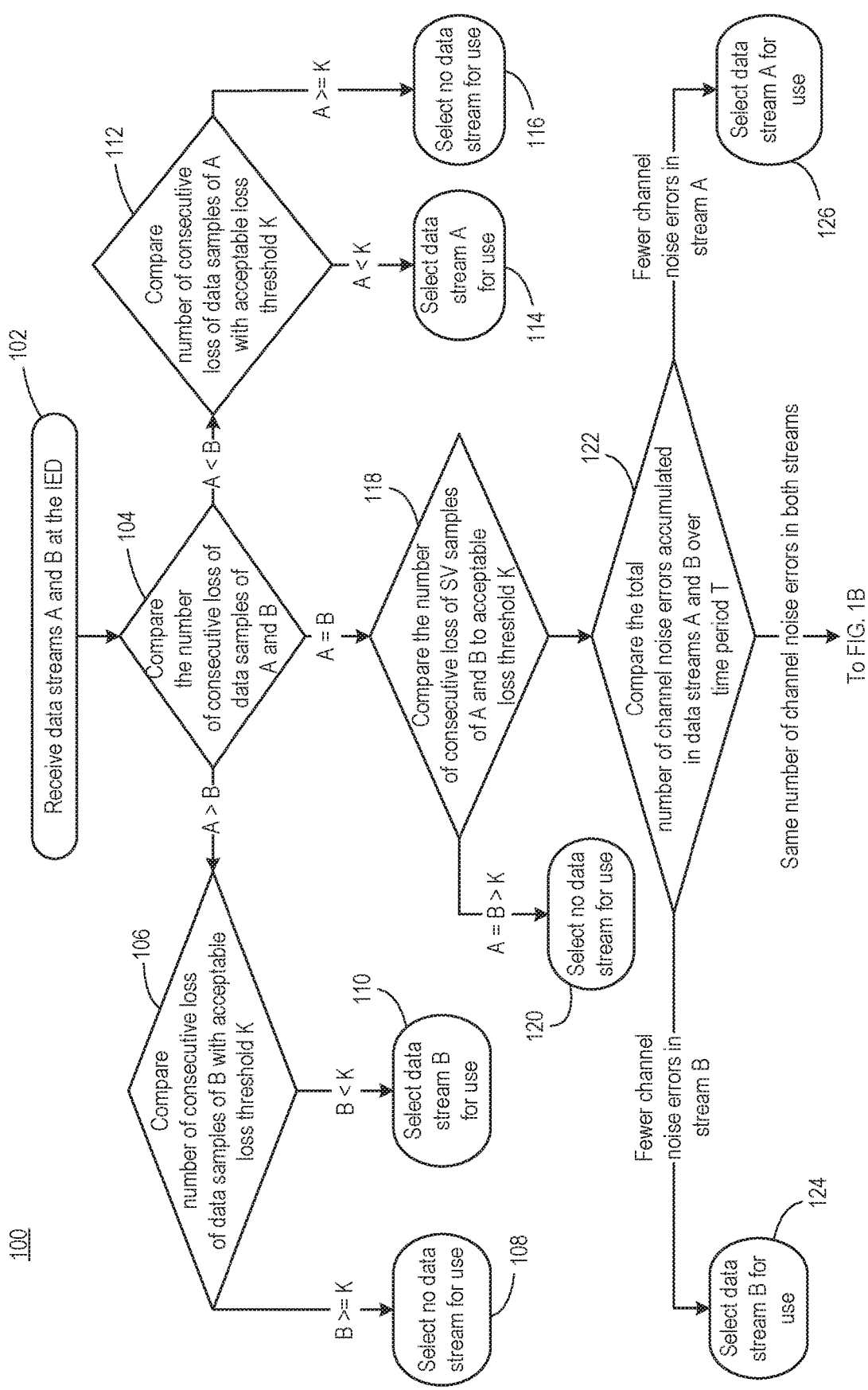
FIGS. 1A and 1B provide a flowchart of an embodiment of a method for selecting a data stream.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

This disclosure provides methods and systems to analyze, compare, and select a data stream from multiple, potentially redundant, data streams. In some critical infrastructures, redundant data streams may be provided to ensure data arrival. For example, in an electrical system a first current transformer (CT) may measure a current value on a transmission line. A second CT may measure the same current value at or near the same location on the transmission line. It should be noted that CTs herein may be CTs that have a digital interface, also known as non-conventional instrumental transformer (NICT). Both the first and second CTs may transmit the data to a monitoring device as a redundant measurement. With ideal conditions, the data streams are identical or substantially identical. However, degradation of one signal may result in the other, un-degraded signal being preferred or "better." Accordingly, the methods and systems disclosed herein provide an approach for selecting between multiple redundant data streams based on the measured, determined, and/or reported characteristics of the multiple redundant data streams.

As a specific example, a data stream selection system may comprise an Intelligent Electronic Device (IED) to select between multiple redundant data streams. A sensor measurement may be transmitted as an International Electrotechnical Commission (IEC) standard 61850 9-2 Sampled Value (SV) data stream. An IED may be configured to receive two (or more) redundant signals as IEC standard 61850 9-2 SV data streams. The IED may include and/or interface with a data stream selector. The data stream selector may be implemented in hardware and/or software.

A data stream selector may receive one or more data streams via a communications network. In some embodiments, the data streams may comprise a set or sets of data frames according to one or more of a wide variety of protocols. In some embodiments, the data stream selector may receive redundant data streams using the same protocol and/or transmission medium. In other embodiments, the data stream selector may receive redundant data streams via disparate protocols and/or disparate transmission mediums.

In various embodiments, the data streams may include data corresponding to individual values and/or measurements of a measured characteristic of a component or portion of an electrical system. For instance, the values or measurements may be provided by a sensor, such as a sensor for monitoring a portion of a power distribution system.

The data streams may be dynamic in nature in that the values or measurements recorded by the sensor, and thus the data transmitted within the data streams, change over time. Further, the accuracy and/or integrity of the data included in the data streams may change with time, as circumstances affecting the generation and communication of the data change.

A data stream selector may receive one or more data streams as a series of data frames over a period of time. The data frames may (or may not) include one or more of a timestamp; sampled value data, such as (by way of a non-limiting example) IEC 61850 9-2 SV data; and validity data indicative of the data integrity of the data stream.

As previously described, an IED configured to monitor and/or protect a portion of a power distribution system may include a data stream selector as described herein. In other embodiments, a data stream selector may be a separate device in communication with an IED. In some embodiments, a transmitting IED may apply a timestamp to data as it is collected, measured, and transmitted to a data stream selector (optionally integrated within or in communication with a receiving IED). In other embodiments, a receiving IED with an integrated data stream selector may apply a timestamp to data as it is received. In still other embodiments, a transmitting sensor may add a timestamp or utilize a transmission protocol that includes a timestamp.

A data stream selector may be configured to monitor, process, and/or select between two or more data streams which contain redundant measurements of the same characteristic of a component or portion of an electrical system. For example, in a power distribution electrical system, a first data stream may include synchrophasor measurements/calculations for a power distribution line at a first location. A second data stream may include redundant synchrophasor measurements/calculations for the same power distribution line at or near the same location.

When a plurality of data streams providing redundant measurements are available, the data stream selector may be configured to select one data stream from the plurality of data streams based on various criteria (e.g., data stream characteristics—whether monitored, measured, self-reported, and/or otherwise identified or detected).

For example, a data stream selector may compare and select between the plurality of data streams using a provided or calculated number of consecutive lost samples for each individual data stream. An IED associated with a data stream selector that processes, receives and/or monitors the plurality of data streams may track, count, or otherwise evaluate the individual counts of the consecutive lost sample numbers of the plurality of data streams being monitored and/or processed.

Additionally and/or alternatively, a data stream selector may select between a plurality of data streams based on the number of channel noise errors in each individual data stream that occur during a predetermined time period. An IED associated with a data stream selector may track the number of channel noise errors for a predetermined time period that occur in each of the plurality of data streams. The data stream selector may determine which of the plurality of data streams to utilize based on which of the plurality of data streams is reported to have the lowest number of channel noise error occurrences during the predetermined time period.

In some embodiments, an external IED or other data receiving device may provide the data stream selector with the number of channel noise error occurrences during a predetermined time period for each of the plurality of data streams. In yet another embodiment, manual input by an operator may provide the data stream selector with the number of channel noise error occurrences during a predetermined time period for each of the plurality of data streams.

Channel noise errors may comprise data unit length errors, where a received data stream or portion of a data stream is not of the expected/appropriate length; data range errors, wherein at least some of the data or data frames comprised by the data stream are not of the expected quantity and/or are not in the appropriate ordering; message corruption errors, wherein all or part of a received data stream is in a corrupted form; and/or payload errors. In various embodiments, a channel noise error may constitute any of a wide variety of channel and/or noise errors as defined by a utilized protocol, such as, for example, the 61850 9-2 protocol A data stream selector may select between a plurality of data streams using clock synchronization values. The selection may be based on clock synchronization values associated with each of the plurality of data streams. The plurality of data streams may each provide their associated clock synchronization values to the data stream selector as part of their data stream data. Alternatively, one or more IEDs may provide the data stream selector with the clock synchronization values of one or more of the plurality of data streams. In other embodiments, manual input may provide the data stream selector with the clock synchronization values of the plurality of data streams. The data stream selector may analyze the clock synchronization corresponding to each data stream for a specific value in order to make a selection. Alternatively, the data stream selector may select a data stream based on a relative priority of any differing clock synchronization values corresponding to the individual data streams.

A data stream selector may select between a plurality of data streams using traversal times associated with the data streams. The data stream selector may calculate the traversal times of one or more data streams based on a timestamp added to or associated with a data stream by an IED.

In one embodiment, one or more external IEDs engaged in monitoring and/or processing the plurality of data streams may add timestamps to the individual data streams before the data stream selector receives those data streams. In such an embodiment, the data stream selector may use the timestamp data provided within the data stream itself. Alternatively, an external IED may associate a timestamp with each individual data stream and communicate that timestamp to the data stream selector separately from the plurality of data streams.

The data within the data streams may include traversal times available for the data stream selector to use. Data stream traversal times may be provided from another outside source, such as manual input.

The data stream selector may use the applied (or alternatively received) timestamp corresponding to each data stream to calculate a traversal time relative to the known or presumed time of an event triggering the sending of the data stream to the data stream selector.

A data stream selector may select between a plurality of data streams based on MAC addresses associated with each of the data streams. The data within an individual data stream may include a MAC address for the data stream selector to associate with that data stream. Alternatively, an external IED may provide the data stream selector with a MAC address to associate with one or more of the plurality data streams being monitored and/or processed by the data stream selector. In another alternative embodiment, manual input may provide one or more MAC addresses to associate with corresponding one or more data streams.

An IED responsible for monitoring and/or protecting a component or portion of a power distribution system may utilize data from a data stream selected by the data stream selector to perform its monitoring and/or protecting responsibility. Alternatively, the data stream selector may communicate with an external IED that is responsible for monitoring and/or protecting a component or portion of a power distribution system. In such an embodiment, the data stream selector may communicate information representing which data stream was selected by the data stream selector to the external IED, such that the external IED may use that data stream as a preferred data stream or to the exclusion of the unselected data stream. The data stream selector may communicate data from the data stream selected by the data stream selector to the external IED such that the external IED may use that data to perform its monitoring and/or protecting responsibility.

The monitoring and/or protection actions performed by the responsible IED (whether this IED includes an integrated data stream selector or is in communication with an independent or external data stream selector) may comprise performing programmed automation based on the data from the selected data stream, recording the data from the selected data stream, and/or reporting the data from the selected data stream.

The systems and methods described herein may be expanded for use in an enterprise and/or industrial environment in which a data stream selection module or data stream selection device may be in communication with any number (i.e., hundreds or even thousands) of pairs of IEDs functioning in dual-primary or primary-backup configurations. Accordingly, a centralized data stream selection system may be capable of receiving data streams from devices and/or IEDs throughout an electric power delivery system.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, Field Programmable Gate Array (FPGA), or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

A communications network may transfer data streams according to one or more appropriate data transmission protocols. The data transmission protocol or protocols used to transmit the data stream may be related to the IEC 61850 standard, may be a TCP/IP protocol, and/or may include any other protocol or protocols appropriate for transmitting a data stream through a communications network. The communications network may utilize any of a wide variety of transmission mediums as well, including wireless and wired transmission mediums/channels, such as a copper, optical, aluminum, etc.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

Figure 1B:
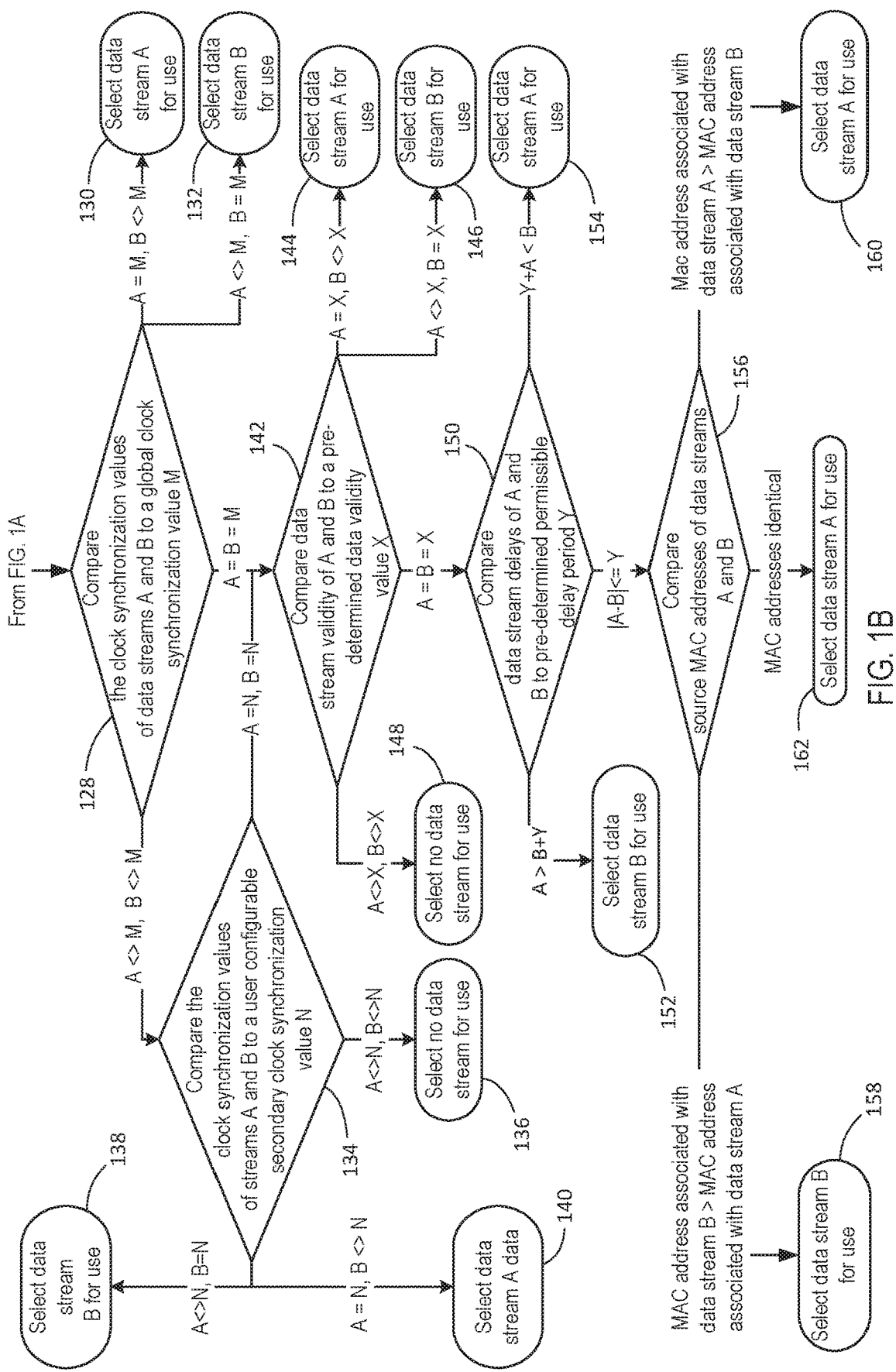

FIGS. 1A and 1B provide a flowchart representing a logical process 100 that a data stream selector may use to select one of two data streams. It is appreciated that the same comparison may be applied to any number of data streams. As shown in FIGS. 1A and 1B, a data stream selector may perform its analysis, comparison, and/or selection based on multiple characteristics of the input streams. FIGS. 1A and 1B are presented by way of example and not by way of limitation as one of many possible methods used by a data stream selector.

As illustrated in FIGS. 1A and 1B, an IED comprising the data stream selector receives data streams A and B, at 102. In the illustrated embodiment, the data stream selector selects between data streams A and B based on data stream characteristics. As illustrated, if the data stream selector's execution of any logic flow leads to a determinative outcome (represented by ovals in FIGS. 1A and 1B), the data stream selector applies that outcome and the process may terminate. A determinative outcome may be that the data stream selector selects data stream A, selects data stream B, or identifies both data streams as unsuitable or erroneous. The data stream selector may discontinue the analysis once a determinative outcome has been reached. Alternatively, the data stream selector may reach multiple determinative outcomes and provide a final determination based on a weighted or averaged combination of determinative outcomes.

The data stream selector may analyze and/or compare various qualities or characteristics of data streams A and B. The qualities or characteristics vary with time based on the sensor itself, the communication medium, and/or various other data gathering, processing, transmission, and/or receiving complications. Accordingly, the data stream selector may repeat the process of FIGS. 1A and 1B on data streams A and B continuously, periodically, or upon request. Each repetition of the process in FIGS. 1A and 1B may result in a different outcome depending on the qualities or characteristics of the data streams at that time.

The data stream selector may iterate as described above continuously, or the data stream selector may instead perform an iteration of the process at predetermined time intervals or at predetermined points in time. It is further anticipated that the data stream selector may engage this selection process in response to electronic or manual input from an outside source.

The data stream selector may compare the number of consecutive loss of data samples of each of data streams A and B, at 104. If the loss of data samples of data stream A is greater than the loss of data samples of data stream B, and the number of consecutive losses of data samples of data stream B are below an acceptable threshold, at 106, then the data stream selector may select data stream B, at 110. If the number of consecutive losses of data samples of data stream B are equal to or above the acceptable threshold, at 106, then no data stream may be selected and/or both data streams may be identified as invalid, unusable, and/or erroneous, at 108.

Similarly, if the loss of data samples of data stream B is greater than the loss of data samples of data stream A, and the number of consecutive losses of data samples of data stream A are below an acceptable threshold, at 112, then the data stream selector may select data stream A, at 114. If the number of consecutive losses of data samples of data stream A are equal to or above the acceptable threshold, at 112, then no data stream may be selected and/or both data streams may be identified as invalid, unusable, and/or erroneous, at 116.

According to the illustrated embodiment, if the number of lost data samples for data streams A and B are equal and/or within a predetermined range of each other, at 104, then the data stream selector may compare the number of consecutive loss of SV samples of both data streams A and B with a threshold level, at 118. If the number of loss packets for both data streams A and B are above the threshold level, then no data stream may be selected, at 120. If the number of loss packets for both data streams A and B are below the threshold level, then the data stream selector may compare the total number of channel noise errors accumulated in data streams A and B over a time period T, at 122. If there are fewer channel noise errors in data stream B, then data stream B may be selected, at 124. If there are fewer channel noise errors in data stream A, then data stream A may be selected, at 126. If the number of channel noise errors are the same in both data streams and/or within a predetermined range of one another, then the data stream selector may compare the clock synchronization values of data streams A and B to a global clock synchronization value M, at 128.

As used throughout the specification and claims, the term "same" is used in the context of comparing values to be similar or substantially similar. For example, a value may be the "same" as another value if it is within a predetermined range of another value—even if it is not the exact same value. Thus, the term "same" is used to describe values that are sufficiently similar to one another or sufficiently similar to a threshold value so as to be useable indistinguishable. In the example, above, data stream A may have 100 channel noise errors and data stream B may have 110 channel noise errors. The may be determined to have the "same" number of channel noise errors if the comparator is configured to identify them as "different" only if the difference between channel noise errors is greater than 10% of the total error rate of one of the first and second data streams.

As further described below in conjunction with FIG. 4, the data stream selector of FIG. 1B may compare the clock synchronization values of data streams A and B with the global clock synchronization value M, at 128, and a secondary clock synchronization value N, at 134. As illustrated, based on the comparison: data stream A may be selected, at 130; data stream B may be selected, at 132; no data stream may be selected, at 136; data stream B may be selected, at 138; or data stream A may be selected, at 140.

If the clock synchronization values of data streams A and B are equal to each other (or within a predetermined range of one another) and equal to or within a predetermined range of the global synchronization value M, at 128, then the data stream selector may compare the data stream validity of data streams A and B to a predetermined data validity value X, at 142. Depending on the comparison values, and as illustrated, data stream A may be selected, at 144; data stream B may be selected, at 146, or no data stream may be selected, at 148. If the data stream validity of data streams A and B are equal to one another (or within a predetermined range of one another) and equal to the data validity value X, at 142, then the data stream selector may compare the data stream delays of data streams A and B to a predetermined permissible delay period Y, at 150. If delay of data stream A is greater than the delay of data stream B and the delay period Y, then data stream B may be selected, at 152.

If the delay of data stream B is greater than the delay of data stream A and the delay period Y, then data stream A may be selected, at 154. If, however, the difference between the delays of data streams A and B is less than the delay period Y, then the data stream selector may compare the source MAC addresses of data streams A and B, at 156. If the MAC address of the source of data stream A is preferred, then data stream A may be selected, at 160. To the contrary, if the MAC address of the source of data stream B is preferred, then data stream B may be selected, at 158. If there is no preferred MAC address or they sources are the same, then data stream A (or B) may be selected by default, at 162.

FIGS. 1A and 1B illustrate a series of processes that a data stream selector may sequentially follow to select between two data streams. In alternative embodiments, any of comparisons 104, 118, 122, 128, 142, 150, and/or 156 may be omitted and/or performed in a different order. In some embodiments, one or more of comparisons 104, 118, 122, 128, 142, 150, and/or 156 may be performed in parallel. In a parallel comparison embodiment, each decision may be weighted (equally or unequally) with respect to other decisions and the average decision to select data stream A or data stream B may be selected.

FIGS. 2-7 illustrate a plurality of processes that may be utilized individually or in combination (whether serially or in parallel) to select between two data streams. Any permutation or combination of any of the processes described in FIGS. 2-7 may be utilized.

Figure 2:
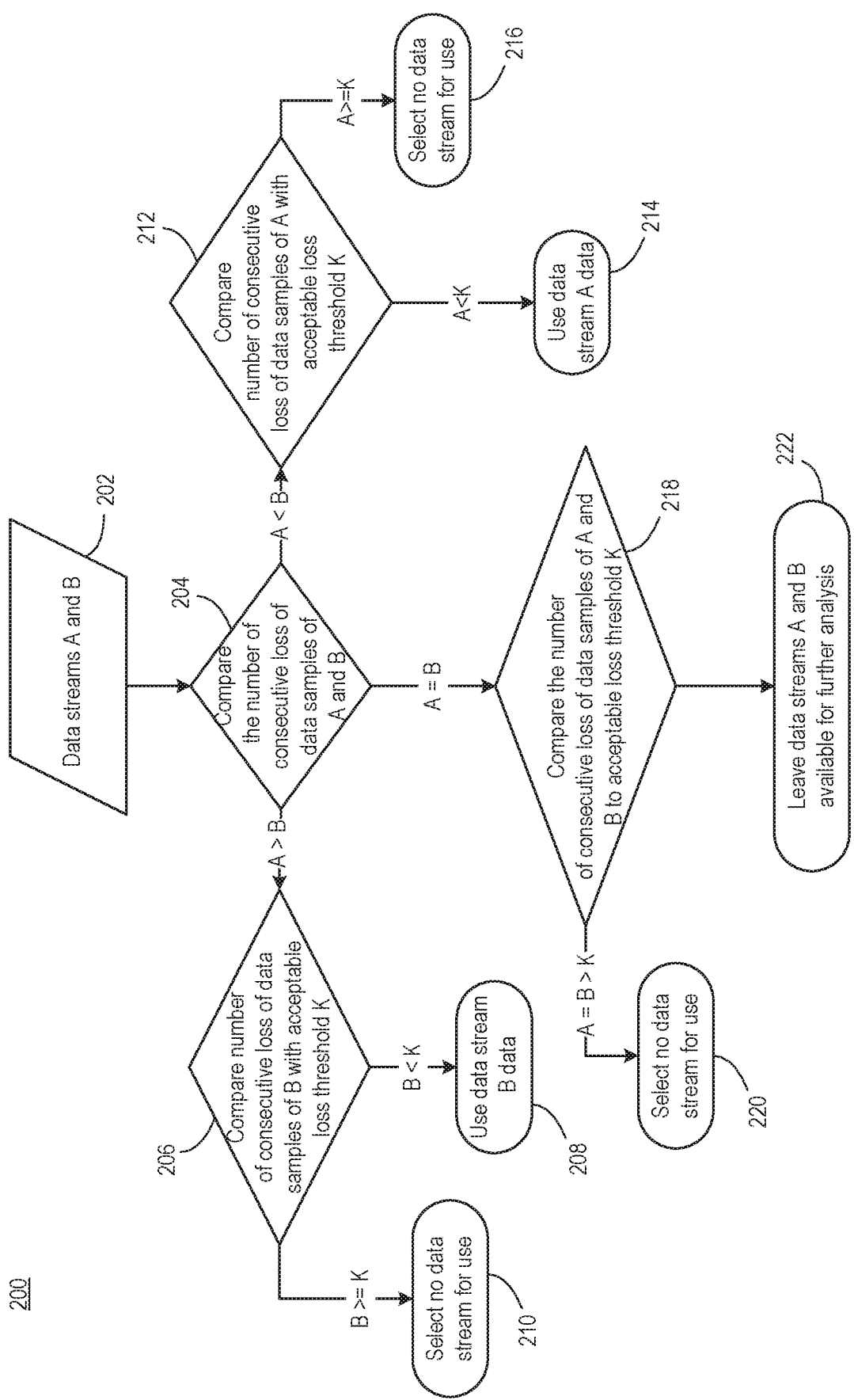
FIG. 2 is a flowchart of a method for selecting between a plurality of data streams based on a number of consecutive missing data samples from each data stream, according to one embodiment.

FIG. 2 is a flowchart showing a process 200 that a data stream selector may use to compare and select between a plurality of data streams based on the number of consecutive lost samples from each data stream, according to one embodiment.

Data streams A and B may be redundant data streams for which consecutive lost sample numbers are available, at 202. At decision point 204, the data stream selector compares the number of consecutive lost samples from data stream A to the number of consecutive lost samples from data stream B. If the data stream selector determines that data stream A has lost more samples than data stream B, the data stream selector compares the number of consecutive lost samples from data stream B to a pre-set upper acceptable loss threshold K, at 206. Subsequently, if the data stream selector determines that data stream B has lost fewer than K samples, the data stream selector selects data stream B, at 208. Otherwise, the data stream selector does not select either data stream, at 210, at which point the decision process terminates.

Alternatively, if at decision point 204 the data stream selector determines that data stream B has lost more samples than data stream A, the data stream selector compares the number of consecutive lost samples from data stream A to a pre-set upper acceptable loss threshold K, at 212. Subsequently, if the data stream selector determines that data stream A has lost fewer than K samples, the data stream selector selects data stream A, at 214. Otherwise, the data stream selector does not select either data stream, at 216, and the decision process terminates.

Finally, if at decision point 204 the data stream selector determines that both data streams A and B have the same number of consecutive lost samples (or are within a predetermined range of each other), the data stream selector moves to decision point 218. At decision point 218, the data stream selector compares the number of consecutive lost samples in streams A and B with the acceptable loss threshold K. If the data stream selector determines that the number of consecutive lost samples in both data stream A and data stream B are greater than K, then the system does not select any data stream and the decision process terminates, at 220. If the data stream selector determines that the number of lost samples in data streams A and B are fewer than the acceptable loss threshold K, then data streams A and B are left available for further processing, at 222. Alternatively, both data streams may be used, an average of the data streams may be used, and/or one data stream may be used as a default.

Figure 3:
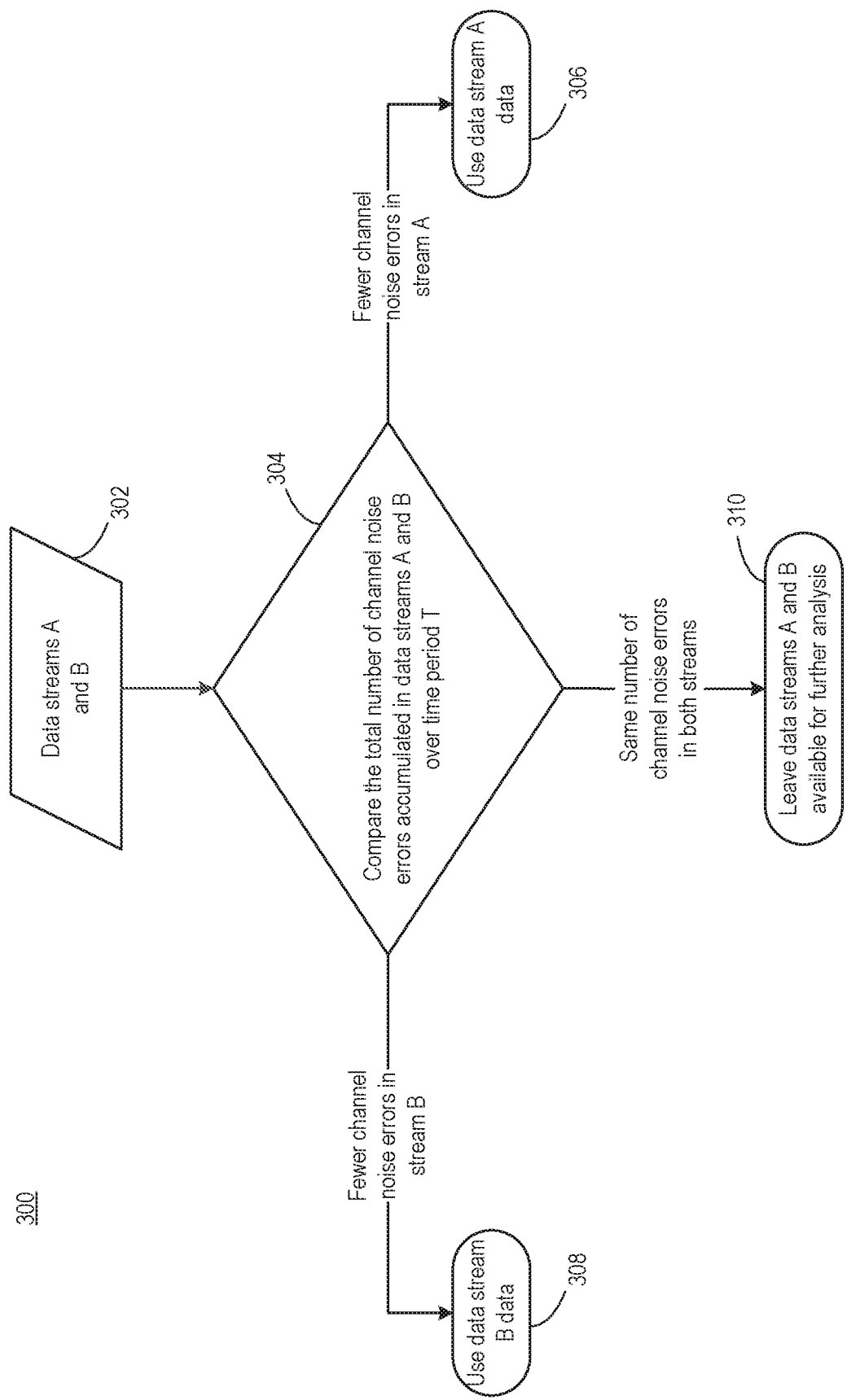
FIG. 3 is a flowchart of a method for selecting between a plurality of data streams based on a number of channel noise errors during a predetermined time period for each data stream, according to one embodiment.

FIG. 3 is a flowchart showing a process 300 that a data stream selector may use to compare and select between a plurality of data streams based on the number of channel noise errors in each individual data stream over a time period T that are being tracked by or provided to the data stream selector.

Again, data streams A and B are redundant data streams for which respective numbers of channel noise errors over time period T are available at 302. At decision point 304, the data stream selector compares the number of channel noise errors associated with data stream A over time period T to the number of channel noise errors associated with data stream B over time period T. If the data stream selector determines that the number of channel noise errors in data stream A over time period T are fewer than the number of channel noise errors in data stream B over time period T, then the data stream selector selects data stream A at 306 and the process terminates.

If, at decision point 304, the data stream selector determines that the number of channel noise errors in data stream B over time period T are fewer than the number of channel noise errors in data stream A over time period T, then the data stream selector selects data stream B at 308 and the process terminates.

If, at decision point 304, the data stream selector determines that the number of channel noise errors in data stream A are equal to the number of channel noise errors in data stream B, then data streams A and B are left available for further processing at 310. Alternatively, both data streams may be used, an average of the data streams may be used, and/or one data stream may be used as a default.

Figure 4:
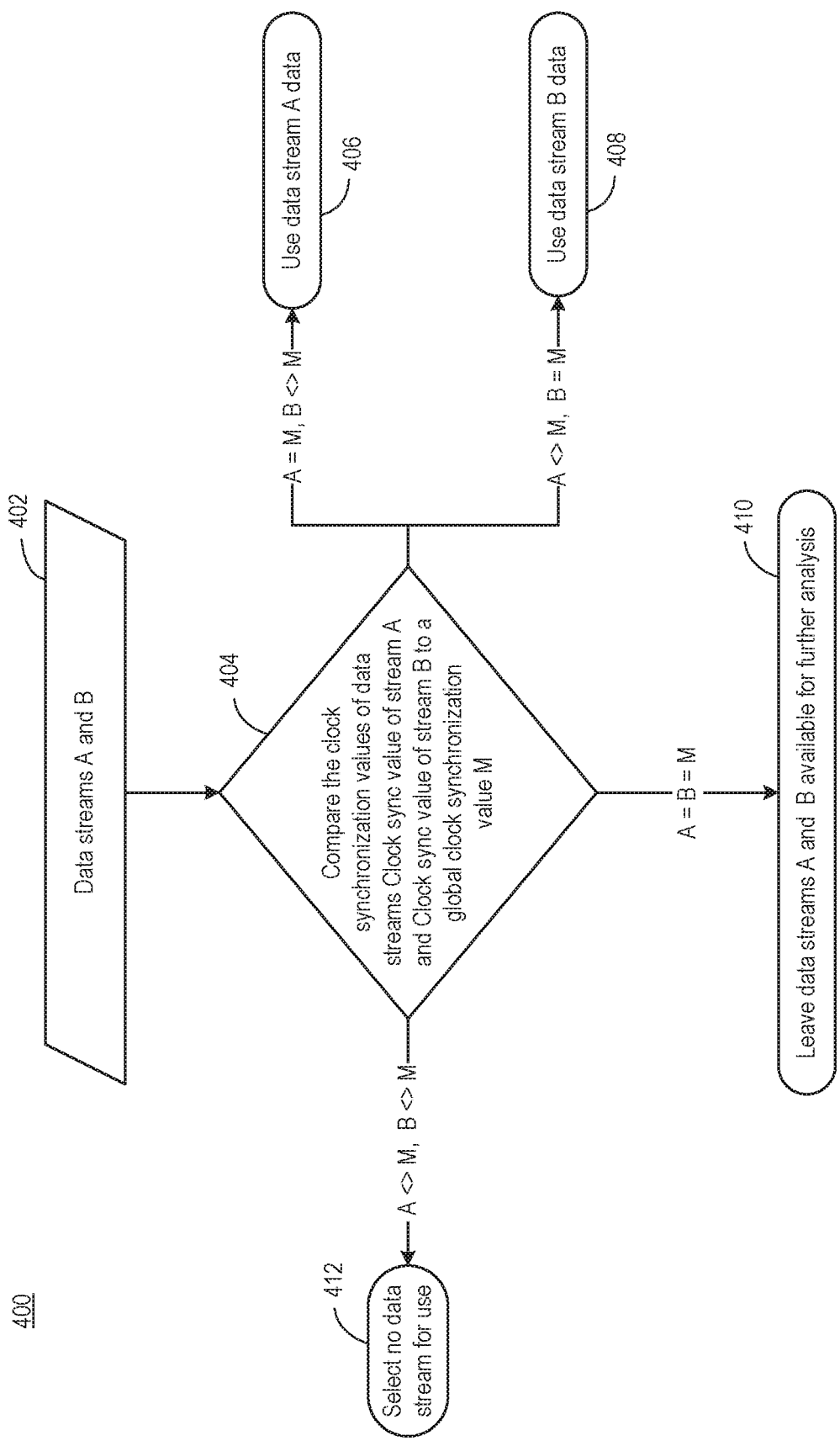
FIG. 4 is a flowchart of a method for selecting between a plurality of data streams based on a clock synchronization value for each data stream, according to one embodiment.

FIG. 4 is a flowchart showing a process 400 that a data stream selector may use to select between a plurality of data streams based on clock synchronization values associated with the data streams.

Redundant data streams A and B may each include or otherwise be associated with clock synchronization values, at 402. At decision point 404, the data stream selector compares the clock synchronization values associated with data streams A and B to a predetermined clock synchronization value M. If the data stream selector determines that the clock synchronization value associated with data stream A is equal to M and that the clock synchronization value associated with data stream B is not equal to M, the data stream selector selects data stream A, at 406, and the process terminates.

If, at decision point 404, the data stream selector determines that the clock synchronization value associated with data stream B is equal to M and that the clock synchronization value associated with data stream A is not equal to M, the data stream selector selects data stream B, at 408, and the process terminates.

If, at decision point 404, the data stream selector determines that the clock synchronization values associated with both data streams A and B are equal to M (or are each sufficiently close to M), then data streams A and B are left available for further processing at 410. Alternatively, both data streams may be used, an average of the data streams may be used, and/or one data stream may be used as a default.

If, at decision point 404, the data stream selector determines that the clock synchronization value associated with data stream A is not equal to M and that the clock synchronization value associated with data stream B is not equal to M, then the data stream selector does not select either data stream at 412 and may identify both data streams as problematic. The decision process then terminates.

Figure 5:
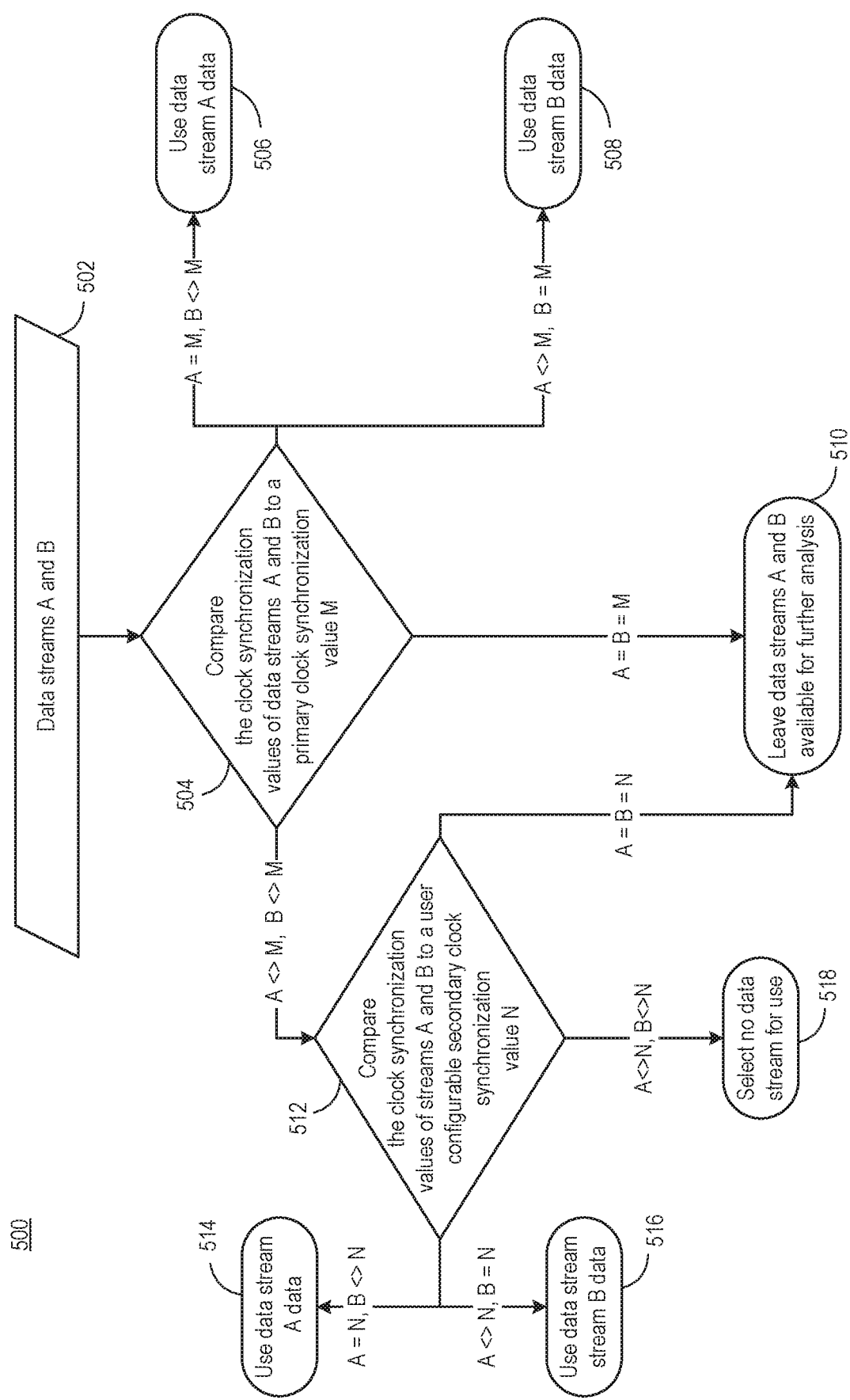
FIG. 5 is a flowchart of another method for selecting between a plurality of data streams based on a clock synchronization value, according to one embodiment.

FIG. 5 is a flowchart showing a process 500 that a data stream selector may use to select between a plurality of data streams based on clock synchronization values associated with the individual data streams.

Redundant data streams A and B may include or be otherwise associated with clock synchronization values, at 502. At decision point 504, the data stream selector compares the clock synchronization values associated with data streams A and B to a predetermined primary clock synchronization value M. If the data stream selector determines that the clock synchronization value associated with data stream A is equal to M and that the clock synchronization value associated with data stream B is not equal to M, the data stream selector selects data stream A, at 506, and the process terminates.

If, at decision point 504, the data stream selector determines that the clock synchronization value associated with data stream B is equal to M and that the clock synchronization value associated with data stream A is not equal to M, the data stream selector selects data stream B at 508 and the process terminates.

If, at decision point 504, the data stream selector determines that the clock synchronization values associated with both data streams A and B are equal to M, then data streams A and B are left available for further processing at 510.

However, if, at decision point 504, the data stream selector determines that the clock synchronization value associated with data stream A is not equal to M and that the clock synchronization value associated with B is not equal to M, the data stream selector proceeds to decision point 512. The data stream selector then compares the clock synchronization values associated with data streams A and B to a predetermined secondary clock synchronization value N.

If, at decision point 512, the data stream selector determines that the secondary clock synchronization value associated with data stream A is equal to N and that the secondary clock synchronization value associated with data stream B is not equal to N, the data stream selector selects data stream A, at 514, and the process terminates.

If, at decision point 512, the data stream selector determines that the secondary clock synchronization value associated with data stream B is equal to N and that the secondary clock synchronization value associated with data stream A is not equal to N, the data stream selector selects data stream B, at 516, and the process terminates.

If, at decision point 512, the data stream selector determines that the secondary clock synchronization value associated with data stream A is not equal to N and that the secondary clock synchronization value associated with B is not equal to N, then the data stream selector does not select either data stream, at 518. The decision process then terminates.

If, at decision point 512, the data stream selector determines that the secondary clock synchronization values associated with data streams A and B are equal to N, then data streams A and B are left available for further processing at 510.

Persons skilled in the art will recognize that the logic flow of FIG. 5 may have more decision points corresponding to the number of separate clock synchronization priority values that are independently available in the data streams. For example, if a tertiary clock synchronization value is available corresponding to data streams A and B, the decision point at 512 may, when the primary and secondary clock synchronization values are the same, continue to a logic operation similar to that of decision point 512 but that uses a tertiary predetermined clock synchronization value, rather than terminating at 510. This process can be further extended to account for any number of clock synchronization values of differing priority that may be available corresponding to data streams A and B.

Figure 6:
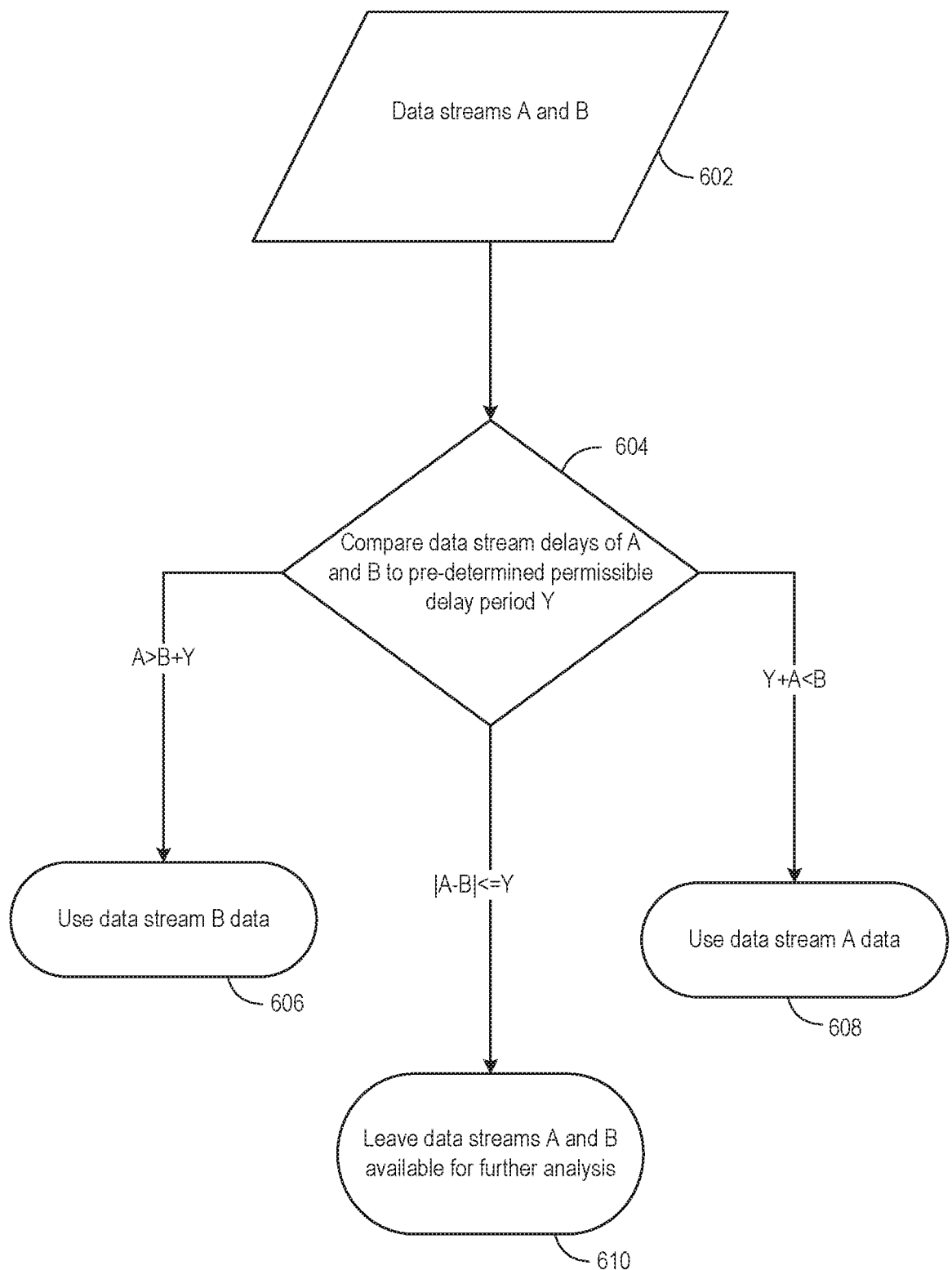
FIG. 6 is a flowchart of a method for selecting between a plurality of data streams based on data stream delay values, according to one embodiment.

FIG. 6 is a flowchart showing a process 600 that a data stream selector may use to select between a plurality of data streams based on the traversal times (e.g., delays) of the data streams.

Redundant data streams A and B may each be associated with a traversal time, at 602. At decision point 604, the data stream selector compares the known (or alternatively, calculated) transmittal delays associated with data streams A and B. If the data stream selector determines that the transmittal delay of data stream A is greater than the transmittal delay of data stream B plus a predetermined transmit offset delay Y, the data stream selector selects data stream B, at 606, and the process terminates.

Alternatively, if, at decision point 604, the data stream selector determines that the transmittal delay of data stream B is greater than the transmittal delay of data stream A plus the predetermined transmit offset delay Y, the data stream selector selects data stream A, at 608, and the process terminates.

If, at decision point 604, the data stream selector determines that the absolute difference between the transmittal delay of data stream A and the transmittal delay of data stream B is less than the value of Y, then A and B are left available for further processing at 610.

Figure 7:
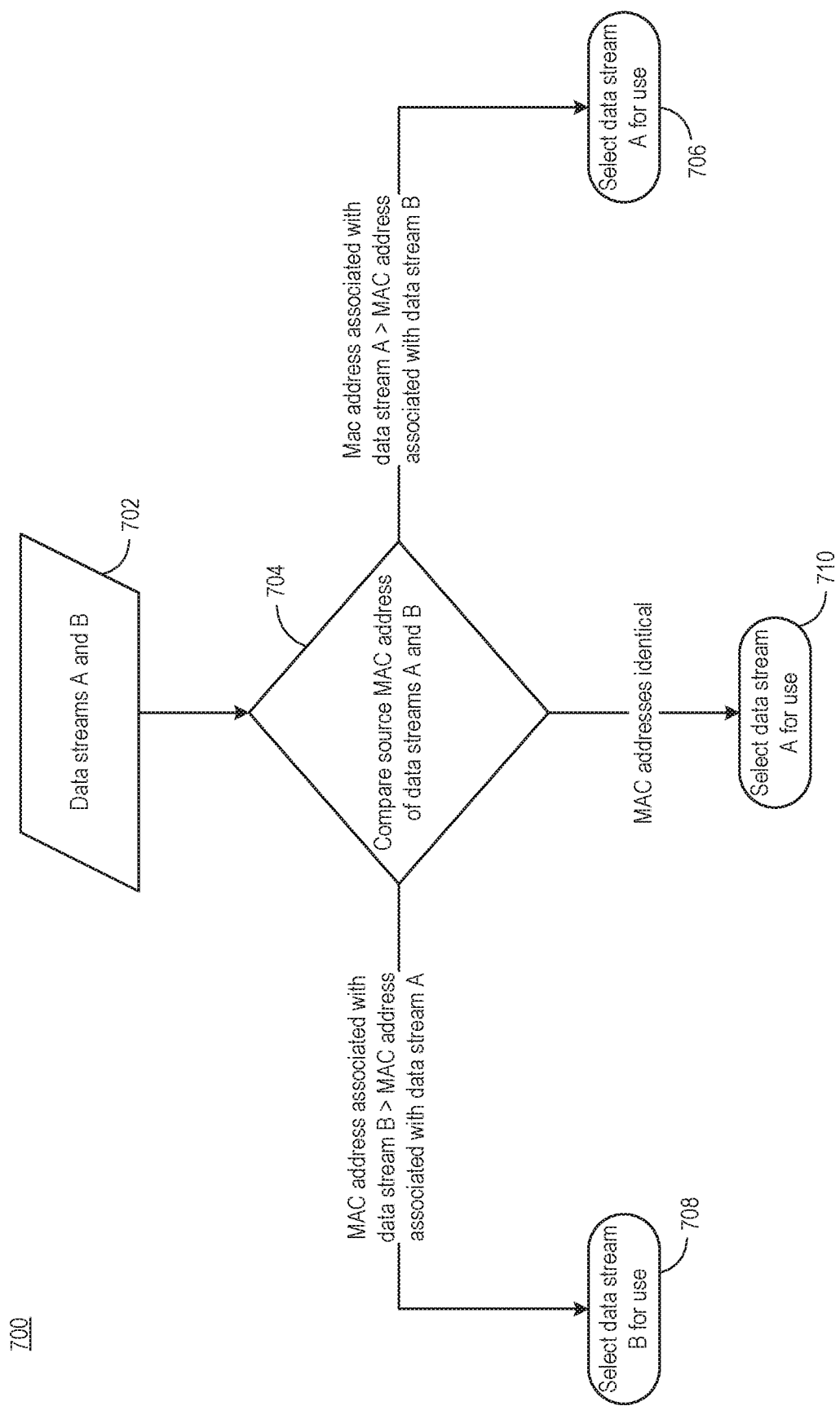
FIG. 7 is a flowchart for a method for selecting between a plurality of data streams based on MAC addresses, according to one embodiment.

FIG. 7 is a flowchart showing a process 700 that a data stream selector may use to select between a plurality of data streams based on MAC addresses associated with each of the data streams.

Data streams A and B are redundant data streams whose associated MAC addresses are available, at 702. At decision point 704, the data stream selector compares the source MAC addresses of data streams A and B. If the data stream selector determines that the source MAC address of data stream A is greater than (e.g., preferred to or actually numerically greater than) the source MAC address of data stream B, then the data stream selector selects data stream A, at 706, and the system terminates.

Alternatively, if the data stream selector determines that source the MAC address of data stream B is greater than (e.g., preferred to or actually numerically greater than) the source MAC address of data stream A, then the data stream selector selects data stream B, at 708, and the system terminates.

As a third alternative, if the data stream selector determines that the source MAC addresses of data streams A and B are equal, then the data stream selector selects data stream A at 710 and the system terminates.

The method taught by the flowchart in FIG. 7 is specially (but not uniquely) useful as a "tiebreaker" when any optionally preceding data stream analyses or comparison logic flows have not resulted in the selection of a data stream and the data stream selector needs to make an "arbitrary" decision as to which data stream to select.

The logical combinations resulting in specific logical ends are presented herein by way of example and not by way of limitation. The individual logical result of each of the logic flows discussed herein can alternatively be achieved through variations to the ordering of the logical steps and logical combinations internal to the logic flow.

The logic flows disclosed herein can be combined in various useful orderings, and a functional data stream selector is not limited to any particular ordering of logic flows that is explicitly represented herein. Further, many functional embodiments of a data stream selector may use only some, but not all, of the logic flows described herein, or a functional data stream selector may comprise additional logic in combination with some or all of the logic flows disclosed herein.

For the purpose of simplicity in illustration, the figures and corresponding portions of the description of embodiments and/or methods used a comparison between two data streams A and B. The use of two data streams in the figures and corresponding portions of the description should not be understood to be a limitation on the number of data streams that can be compared by a data stream selector. The data stream selection logic presented herein can be used (in some cases with slight modification) to select between any number of redundant data streams.

The methods described herein can alternatively be used to select between any number of redundant data streams through the use of an iterative selection process that compares two of the available data streams at a time, and then uses the selected data stream from the previous iteration as a data stream for a subsequent iteration of the same logic flow. A data stream selector may iterate in this fashion until all available redundant data streams have been analyzed and compared, and a final selection of a data stream has been made.

Figure 8:
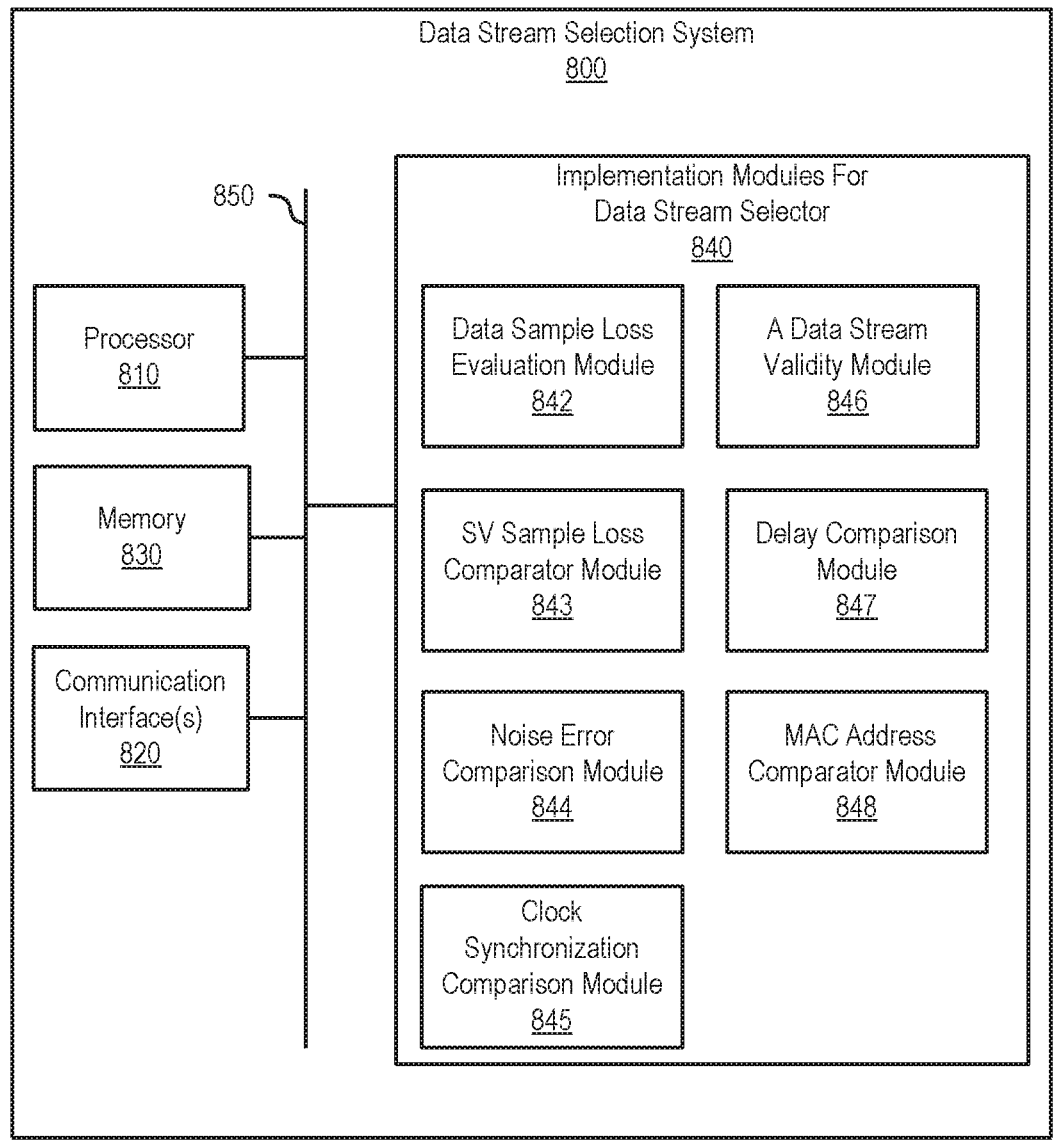
FIG. 8 illustrates a system for selecting between a plurality of data streams based on any of a variety of data stream characteristics, according to various embodiments.

FIG. 8 illustrates a system 800 for selecting between a plurality of data streams based on any of a variety of data stream characteristics, according to various embodiments. As illustrated, a processor 810 may be in communication with one or more communication interfaces 820, memory 830, and implementation modules for a data stream selector 840, via a bus 850. Implementation modules 842-848 may be implemented in software, hardware, firmware and/or any combination or permutation thereof collectively and individually.

The data stream selector 840 may include a data sample loss evaluation module 842 configured to compare the number of consecutive loss of data samples of two or more data streams, as discussed herein. The data stream selector 840 may include an SV sample loss comparator 843 configured to compare the number of lost SV samples of each of the data streams.

The data stream selector 840 may further include a channel noise error comparison module 844 configured to compare the number of channel noise errors accumulated in data streams A and B over a time period T, as described herein. The data stream selector 840 may also include a clock synchronization comparison module 845 configured to compare clock synchronizations of data streams A and B with a global clock synchronization value, as described herein.

The data stream selector 840 may include a data stream validity module 846 configured to compare a validity value of each of the data streams with a data validity value X. The data stream selector 840 may also include a delay comparison module 847 configured to compare data stream delays of each of the data streams relative to a delay period Y. Finally, the data stream selector 840 may include a MAC address comparator, 848, to select one of the data streams based on the highest, lowest, or default preferred MAC address. A data stream selector 840 may omit one or more of the modules 842-848, and/or process them in alternative orders. A selection module 849 may utilize one or more of the modules 842-848 to evaluate data streams A and B to select one of the two data streams for use, optionally to the exclusion of the other. For example, data from one of the two data streams, to the exclusion of the other, may be used by an electrical power delivery system to make a monitoring, protection, and/or reporting decision.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed:

1. A system for monitoring an electrical characteristic within an electrical power delivery system, comprising:
   a first sensor device to measure an electrical characteristic of a component within the electrical power delivery system;
   a second sensor device to measure the same electrical characteristic of the component within the electrical power delivery system;
   a first communication channel to transmit the electrical characteristic measured by the first sensor device as a first sampled value ("SV") data stream;
   a second communication channel to transmit the electrical characteristic measured by the second sensor device as a second SV data stream;
   an intelligent electronic device for receiving the first SV data stream via the first communication channel and the second SV data stream via the second communication channel; and
   a data stream selector to select only one of the first SV data stream and the second SV data stream based on:
      a comparison of a number of consecutive lost samples of the first SV data stream with a number of consecutive lost samples of the second SV data stream.

2. The system of claim 1, wherein the comparison of the number of consecutive lost samples comprises determining that the number of consecutive lost samples of the selected SV data stream is less than the number of consecutive lost samples of the SV data stream that is not selected by the data stream selector.

3. The system of claim 1, wherein the comparison of the number of consecutive lost samples comprises determining that the difference between the number of consecutive lost samples of the first and second SV data streams is significant based on the difference exceeding a loss threshold.

4. The system of claim 1, wherein the selection of one of the first SV data stream and the second SV data stream is based on a rejection of the first or second SV data streams when the respective data stream is missing at least a predetermined number of consecutive SV data stream frames.

5. The system of claim 1, wherein the intelligent electronic device is further to determine a difference between a clock synchronization of the first SV data stream and a clock synchronization of the second SV data stream.

6. The system of claim 5, wherein the intelligent electronic device is further to determine whether the difference between the first and second SV data stream clock synchronizations exceeds a clock threshold.

7. A data stream selection system for an electrical power delivery system, comprising:
- at least one receiver configured to receive a first data stream and a second data stream;
- a sample loss comparison module to evaluate a number of consecutive lost samples of each of the first and second data streams by comparing a number of consecutive lost samples of the first data stream and a number of consecutive lost samples of the second data stream;
- a channel noise error comparison module to evaluate noise errors by comparing a number of channel noise errors in each of the first and second data streams;
- a clock synchronization comparison module to evaluate clock synchronization by comparing clock synchronizations of the first and second data streams to a global clock synchronization value;
- a data stream validity module to compare validity of the first and second data streams by comparing a validity of each of the first and second data streams with a validity threshold;
- a delay comparison module to evaluate a delay of each of the first and second data streams by comparing a delay of the first data stream and a delay of the second data stream; and,
- a selection module to select one of the first and second data streams to the exclusion of the other based on the comparison of consecutive lost samples of each of the first and second data streams and at least one of the following:
  - the number of channel noise errors in each of the first and second data streams;
  - the clock synchronizations of the first and second data streams;
  - the validity of each of the first and second data streams; and,
  - the delay of each of the first and second data streams.

8. The data stream selection system of claim 7, wherein the selection is made further based on a difference between a number of consecutive lost samples of the first data stream and number of consecutive lost samples of the second data stream exceeding a loss threshold.

9. The data stream selection system of claim 7, wherein the selection selects the first data stream when the number of consecutive lost samples of the first data stream is less than the number of consecutive lost samples of the second data stream.

10. The data stream selection system of claim 7, wherein the selection is made further based on a difference between a clock synchronization of the first data stream and a clock synchronization of the second data stream.

11. The data stream selection system of claim 10, wherein the selection is made further based on the difference between the first and second data stream clock synchronizations exceeding a clock threshold.

* * * * *